US009110578B2

(12) United States Patent
Tokkonen

(10) Patent No.: US 9,110,578 B2
(45) Date of Patent: Aug. 18, 2015

(54) ELECTRONIC DEVICE AND METHOD FOR PROVIDING EXTENDED USER INTERFACE

(75) Inventor: Timo Tokkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 523 days.

(21) Appl. No.: 13/605,411

(22) Filed: Sep. 6, 2012

(65) Prior Publication Data
US 2013/0159905 A1 Jun. 20, 2013

Related U.S. Application Data

(63) Continuation of application No. 10/878,503, filed on Jun. 28, 2004, now Pat. No. 8,281,241.

(51) Int. Cl.
G06F 3/00 (2006.01)
G06F 3/0486 (2013.01)
G06F 3/038 (2013.01)
G06F 3/041 (2006.01)
G06F 3/0488 (2013.01)

(52) U.S. Cl.
CPC .............. *G06F 3/0486* (2013.01); *G06F 3/038* (2013.01); *G06F 3/0414* (2013.01); *G06F 3/04883* (2013.01); *G06F 3/04886* (2013.01)

(58) Field of Classification Search
CPC ... G06F 3/0486; G06F 3/0481; G06F 9/4443; G06F 3/038; G06F 3/0414; G06F 3/04883
USPC ........................................................ 715/769
See application file for complete search history.

(56) References Cited

U.S. PATENT DOCUMENTS

| 5,548,702 | A | 8/1996 | Li et al. ........................ 395/155 |
| 5,611,060 | A | 3/1997 | Belfiore et al. ............... 395/341 |
| 5,745,111 | A | 4/1998 | Cline et al. .................... 345/348 |
| 5,757,368 | A | 5/1998 | Gerpheide et al. ........... 345/339 |
| 5,777,616 | A | 7/1998 | Bates et al. ................... 345/339 |
| 6,005,549 | A | 12/1999 | Forest .......................... 345/157 |
| 6,433,800 | B1 | 8/2002 | Holtz ............................ 715/835 |
| 6,757,002 | B1 | 6/2004 | Oross et al. .................. 715/864 |
| 6,888,532 | B2 | 5/2005 | Wong et al. .................. 345/156 |
| 6,909,407 | B1 | 6/2005 | Schradi et al. .................. 345/7 |
| 6,976,224 | B2 | 12/2005 | Nii ................................ 715/769 |
| 7,110,005 | B2 | 9/2006 | Arvin et al. .................. 345/619 |
| 7,302,649 | B2 | 11/2007 | Ohnishi et al. ............... 715/838 |
| 7,348,965 | B2 | 3/2008 | Itoh ............................... 345/173 |

(Continued)

FOREIGN PATENT DOCUMENTS

JP 9128187 A 5/1997

OTHER PUBLICATIONS

Desai, Shrinand and Yang, Cui-Qing; "Implementing a Generalized Drag-and-drop in X" Department of Computer Science University of North Texas; Research Paper (1994) 13 pages.

*Primary Examiner* — David Phantana Angkool
(74) *Attorney, Agent, or Firm* — Harrington & Smith

(57) ABSTRACT

An electronic device and a method for providing an extended user interface in an electronic device are provided. The electronic device comprises a user interface and a display configured to display data objects. The device is configured to detect selection of a data object on the display, detect dragging of the selected data object to a border of the display and to detect an effort to drag the object over the border in a given direction outside the display. A predetermined action is performed in the device on the basis of the detected effort and the detected direction.

20 Claims, 3 Drawing Sheets

(56) References Cited

U.S. PATENT DOCUMENTS

| | | | |
|---|---|---|---|
| 7,586,404 B2 | 9/2009 | Kageyama et al. | 340/461 |
| 7,733,637 B1 | 6/2010 | Lam | 361/679.11 |
| 7,739,604 B1 | 6/2010 | Lyons et al. | 715/736 |
| 7,859,518 B1 | 12/2010 | Northway et al. | 345/169 |
| 7,864,514 B2 | 1/2011 | Lee et al. | 361/679.21 |
| 7,882,162 B2 | 2/2011 | Hunt et al. | 707/899 |
| 7,952,569 B2 | 5/2011 | Hunt et al. | 345/179 |
| 8,281,241 B2 * | 10/2012 | Tokkonen | 715/708 |
| 8,510,671 B1 * | 8/2013 | Tokkonen | 715/769 |
| 8,872,727 B2 * | 10/2014 | Reeves et al. | 345/1.1 |
| 8,874,894 B2 * | 10/2014 | Reeves et al. | 713/100 |
| 8,904,165 B2 * | 12/2014 | Reeves et al. | 713/100 |
| 8,910,061 B2 * | 12/2014 | Reeves et al. | 715/761 |
| 8,943,582 B1 * | 1/2015 | Zhou et al. | 726/19 |
| 2001/0044858 A1 | 11/2001 | Rekimoto | 710/1 |
| 2002/0075309 A1 | 6/2002 | Michelman et al. | 345/764 |
| 2003/0013483 A1 | 1/2003 | Ausems et al. | 455/556 |
| 2004/0001073 A1 | 1/2004 | Chipchase et al. | 345/619 |
| 2004/0075676 A1 | 4/2004 | Rosenberg et al. | 345/701 |
| 2004/0150664 A1 | 8/2004 | Baudisch | 345/740 |
| 2005/0268250 A1 | 12/2005 | Skistimas et al. | 715/810 |
| 2005/0289476 A1 | 12/2005 | Tokkonen | 715/769 |
| 2006/0070007 A1 | 3/2006 | Cummins et al. | 715/769 |
| 2007/0033540 A1 | 2/2007 | Bridges et al. | 715/769 |
| 2011/0181603 A1 | 7/2011 | Liang et al. | 345/473 |
| 2012/0072853 A1 * | 3/2012 | Krigstrom et al. | 715/748 |
| 2012/0084694 A1 | 4/2012 | Sirpal et al. | 715/769 |
| 2012/0278727 A1 * | 11/2012 | Ananthakrishnan et al. | 715/748 |
| 2013/0201139 A1 * | 8/2013 | Tanaka | 345/173 |
| 2015/0033165 A1 * | 1/2015 | Yoo et al. | 715/765 |

* cited by examiner

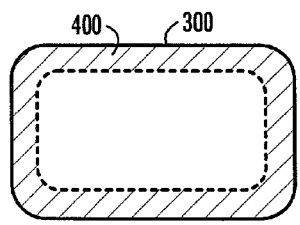
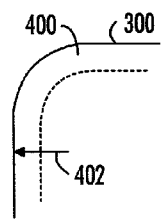
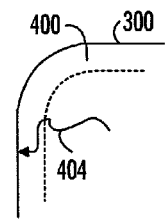
FIG. 4A  FIG. 4B  FIG. 4C
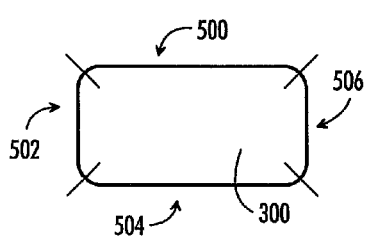
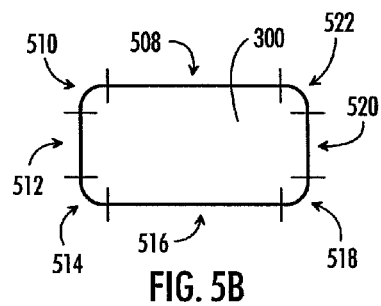
FIG. 5A  FIG. 5B
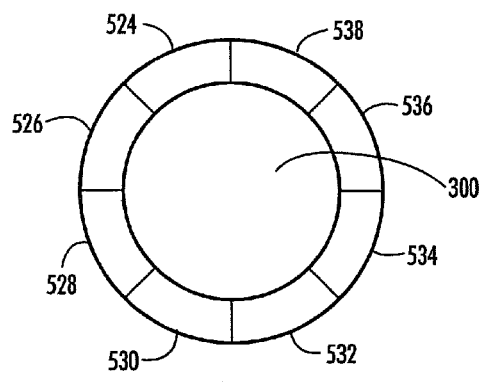
FIG. 5C

ELECTRONIC DEVICE AND METHOD FOR PROVIDING EXTENDED USER INTERFACE

CROSS REFERENCE TO RELATED APPLICATION

This application is a continuation application under 35 USC §120 and 37 CFR 1.53(b) of co-pending U.S. patent application Ser. No. 10/878,503, filed on Jun. 28, 2004; which is herein incorporated in its entirety.

FIELD

The invention relates to an electronic device with a display and a method for improving the usability of the device.

BACKGROUND

Electronic devices comprising a display and intended for processing data provide users with a user interface with which the user may operate the device. Typical examples of such devices are personal computers, personal digital assistants (PDA) and recently also terminal equipment of cellular radio systems. The user interface provided by the devices usually comprises a graphical display, a pointer device, such as a mouse or a digital pen, and/or a keyboard. With the interface, the user may perform various actions on data objects, such as editing, saving, printing, for example.

In the past, performing these actions required the user to browse menus and select a command from a list. To increase the user friendliness of the user interfaces a drag-and-drop-technique (DnD) has been introduced. In DnD, the user may select a data object, such as an icon representing a file, using a pointer device, such as a mouse, and drag and drop the object to an icon representing a printer in order to print the file. Correspondingly, dragging and dropping a data object to an icon representing a data storage, such as a folder or a disk drive, copies the data object to that data storage. DnD thus increases the usability of the user interface.

However, the DnD requires the user to be rather accurate with the pointing device. The dragging and dropping must be performed precisely on top of the predetermined icons in order to perform the given action. This may be difficult especially in portable devices. Furthermore, if the electronic device has a small display, the workspace may be limited. Icons on the display reduce the useful workspace even more.

BRIEF DESCRIPTION OF THE INVENTION

An object of the invention is to provide an improved electronic device and improved method for providing an extended user interface. According to an embodiment of the invention, there is provided a method for providing an extended user interface in an electronic device where data objects are displayed on a display, the method comprising: detecting a selection of a data object on the display; detecting the dragging of the selected data object; detecting an effort to drag the object over a border of the display towards a given direction outside the display; performing a predetermined action on the basis of the detected effort and the detected direction.

According to another embodiment of the invention, there is provided an electronic device comprising a user interface and a display configured to display data objects, the device being configured to detect a selection of a data object on the display, detect dragging of the selected data object to a border of the display, detect an effort to drag the object over the border in a given direction outside the display, and perform a predetermined action on the basis of the detected effort and the detected direction.

The method and system of the invention provide several advantages. The proposed solution saves workspace on the display of the device and gives a rapid access to desired actions or functions. The solution is especially useful in portable devices where the size of the display is small.

In an embodiment, the device comprises detachable tokens on different sides of the display. The tokens indicate the action performed when a data object is dragged to the corresponding side of the display. The tokens may be of different color or they may comprise a label describing the action.

LIST OF DRAWINGS

In the following, the invention will be described in greater detail with reference to the preferred embodiments and the accompanying drawings, in which FIGS. 1A to 1C illustrate examples of an electronic device;

FIGS. 4A to 4C illustrate another embodiment of dragging,

FIGS. 5A to 5C illustrate embodiments of dividing border of a display into sections.

DESCRIPTION OF EMBODIMENTS

Figure 1A:
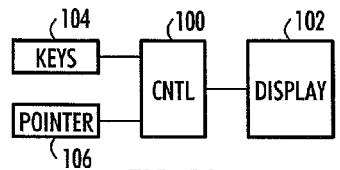

With reference to FIG. 1A, examine an example of an electronic device in which embodiments of the invention can be applied. The electronic device comprises controlling means 100, typically implemented with a microprocessor, a signal processor or separate components and associated software. The device further comprises a display 102. The display is typically configured to display graphics and text. The device may also comprise a keypad 104 and a pointer device 106, such as a mouse, a track stick or a touch-pad. Depending on the type of the device, there may be different and a different number of user interface parts.

Figure 1B:
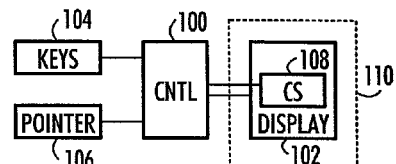

In an embodiment of FIG. 1B, the device comprises a display 102 and a contact surface 108, which together form a touch screen 110. The touch screen 110 is accomplished by placing the contact surface 108 on top of the display 102. An alternative way to implement the touch screen 110 is not to actually place anything on top of the display 102, but to indicate the contact point by other means. The display 102 is typically, but not necessarily, a liquid crystal display.

Figure 1C:
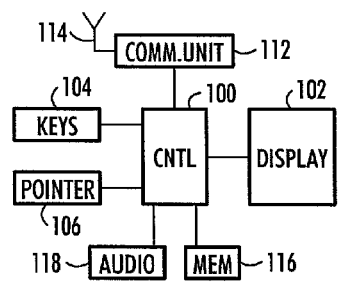

In an embodiment of FIG. 1C, the device may also comprise communication means 112 implementing the functions of terminal equipment including speech and channel coders, modulators and RF parts. The device may also comprise an antenna 114. The device also typically comprises a memory 116 for storing e.g. telephone numbers, calendar data and other user-specific data, and an audio interface 118, which typically comprises a microphone and a loudspeaker.

The electronic device is not restricted to the above example. The electronic device may be a personal computer, a personal digital assistant, terminal equipment or any other device comprising a display and means to perform desired actions on items displayed on the display.

Figure 3A:
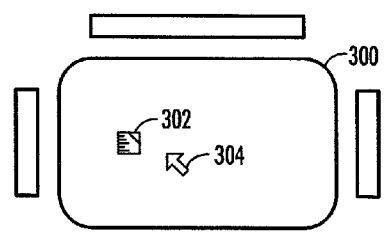
FIGS. 3A to 3C illustrate an embodiment of selection and dragging.
Figure 2:
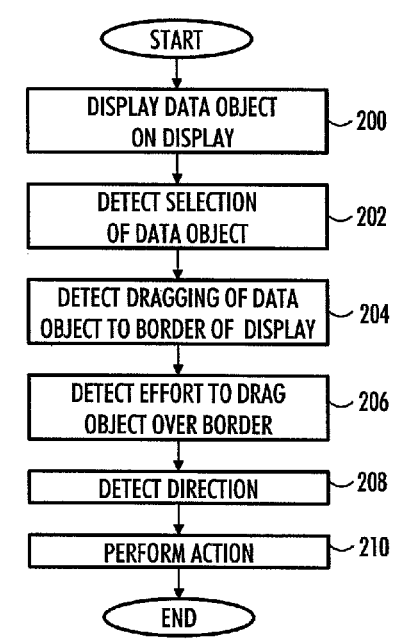
FIG. 2 illustrates an embodiment of the invention.
Figure 3B:
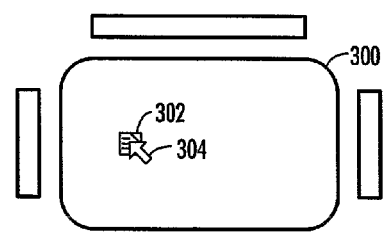
Figure 3C:
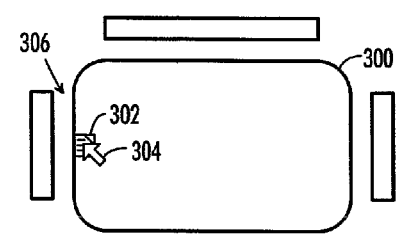

An embodiment of the invention is illustrated in the flowchart of FIG. 2 and in FIGS. 3A to 3C. FIGS. 3A to 3C show a display 300 of an electronic device implementing an embodiment of the invention. In step 200, a data object 302 is displayed on the display. The data object may be displayed as an icon. The data object may be a file stored in a memory 116 of the electronic device. The display also shows a pointer cursor 304 displayed as an arrow.

The pointer device 106 may be a mouse comprising one or more buttons, for example. The controlling means of the electronic device is configured to detect the movements of the pointer and the state of the buttons of the pointer device.

In step 202 and FIG. 3B, the controlling means 100 of the device detect the selection of the data object 302. The user may have moved the pointer cursor 304 over the icon representing the data object 302 and pressed a pointer device button, for example.

In steps 204 to 208 and FIG. 3B, the controlling means 100 of the device detect first dragging of the data object 302 to a border 306 of the display, and then an effort to drag the object over the border 306 of the display towards a given direction outside the display 300. The detection of the dragging of the object to the border 306 is performed as in prior art. The realization of the detection of the effort to drag the data object over the border 306 depends on the hardware of the device.

In step 210, the controlling means perform a predetermined action on the basis of the detection. The predetermined action may be a basic file operation, such as saving the data object on a data storage, printing the data object on a printer, copying the data object on a predetermined data storage or deleting the data object.

The above procedure makes the execution of basic file operations simple and straightforward. As these functions are frequently performed, the embodiments of the invention simplify the usage of the device and increase the user friendliness. The above procedure may be activated regardless of the software application in use in the device. The predetermined action may thus be a non-application specific action.

In an embodiment, the predetermined action is printing, and the detected effort and the detected direction determine a format used in printing the data object.

In an embodiment, the predetermined action is saving, and the detected effort and detected direction determine the storage where the object is saved. By dragging the data object to a different section of the border the user may thus save the object in different folders or disk drive, for example.

In an embodiment, the controlling means may present the user questions regarding parameters of the action. For example, when the action is to delete a data object, the controlling means may request the user to confirm the action.

In an embodiment, the predetermined action may be a basic operation system action, such as turning off the device, activating a screen saver or locking the user interface of the device.

The detection of the dragging of the data object and the detection of the effort to drag the data object over the border depends on the hardware of the device. When the pointer device is a sensor-based device, it sends sensor information to the controlling means whenever the pointer cursor is using the device. Respectively, the controlling means are informed when a button on the pointer device is being pressed. In such a case, as illustrated in FIG. 3B, when the user moves the pointer cursor on an icon representing a data object and presses a pointer device button, the controlling means detect that the data object has been selected. As the user moves the pointer cursor towards a border of the display keeping the button pressed down, the display shows the data object moving along with the pointer cursor. As the data object and the pointer cursor reach the border of the display as illustrated in FIG. 3C and the user still tries to move the icon over the border of the display by moving the pointer device such as a mouse, the icon on the display does not necessarily move on the display as the border is already reached. However, the controlling means still receive messages from the pointer device that a movement is requested. From this the controlling means are able to determine an effort to drag the data object over the border. A respective solution applies to all sensor-based pointer devices.

Thus, in an embodiment, when the controlling means continue to receive movement messages from the pointer device when the border of the display has been reached and a data object is being selected, the controlling means determine that a predetermined action is requested. The action to be performed depends on the border in question.

In an embodiment, the controlling means start a timer application when a data object is dragged to the border of the display. If the pointer device outputs movement messages for a given time limit, the controlling means make a decision that an effort to drag the object over the border has been detected.

When the pointer device is not a sensor-based device, the selection and detection of the movement of the data object on the display are made according to prior art. An example of a non-sensor-based solution is a stylus and a touch sensitive screen, where the detection of movement is made in the screen electronics. In a non-sensor-based solution, the moved pointer device does not send any sensor data. The area the pointer is moved in performs the detection of movement using a sensor or software.

In an embodiment, the detection of an effort to drag the data object over the border is based on the analysis of the movements of the mouse before reaching the border of the display. FIGS. 4A to 4C illustrate this embodiment. FIG. 4A shows the display 300 of the electronic device of the embodiment. The display comprises an area 400 surrounding the border of the display. The cursor movement in this area 400 is analysed.

For example, when a data object has been selected and the cursor is moved to the border of the display 300 in a straightforward manner 402 illustrated by FIG. 4B. The controlling means are able to determine a direction from the movement of the cursor. The controlling means may determine that the movement of the cursor is intended to continue over the border in the same direction. Thus, the controlling means detect the effort to move the data object over the border.

In the example of FIG. 4C, the data object is moved to the border in a manner 404 which does not imply any given direction. Thus, the controlling means are unable to determine any direction from the movement of the cursor and no detection of the effort to move the data object over the border can be made.

In an embodiment, each side of the display corresponds to a different action. Depending on the physical dimensions of the display, the border may also be divided into several sections which correspond to different actions. FIG. 5A illustrates an embodiment where the border of the display 300 of an electronic device has been divided into four sections 500 to 506. Dragging a data object to different sections produces a different action.

FIG. 5B illustrates an embodiment where the border of the display 300 of an electronic device has been divided into eight sections 508 to 522.

FIG. 5C illustrates an embodiment where the border of the round display 300 of an electronic device has been divided into eight sections 524 to 538 surrounding the display.

The actions performed by the device when an effort to drag the object over a border of the display has been detected may be user selectable. The device may comprise software which enables the user of the device to select which section of the border of the display corresponds to a given action.

In an embodiment, a casing or cover of the device surrounding the display may comprise detachable tokens on different sides of the display. These tokens indicate the action performed when a data object is dragged towards the corresponding side of the display. The tokens may indicate different actions with different colors. The tokens may also comprise a label, a pattern, an image or other identification describing the action. This has the advantage of visually keeping the user up to date of the actions performed when a data object is dragged over the border.

Figure 6:
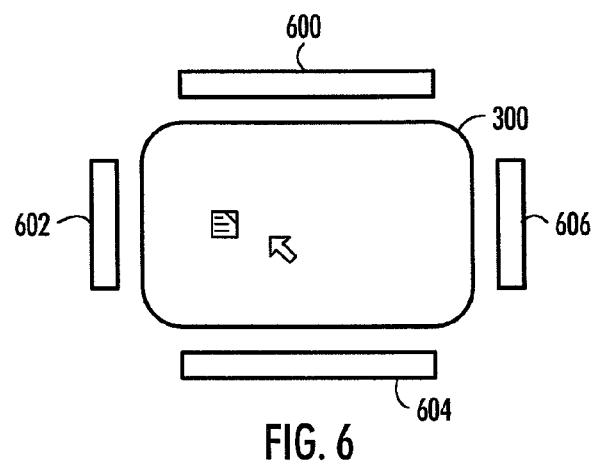
FIG. 6 illustrates an embodiment with tokens around the display and FIGS. 7A and 7B illustrate an embodiment of the use of the tokens.

In the embodiment of FIG. 6, the display 300 of the device is divided into four sections. The device comprises four tokens 600 to 606 surrounding the display 300. In an embodiment each token comprises a label stating the action which is performed when a data object is dragged over the border to the direction of the token. The tokens may comprise labels "PRINT", "SAVE", "DELETE", "COPY", for example. In another embodiment, the tokens are of different colors. If the user changes the actions via software the tokens may be moved from side to side.

Figure 7A:
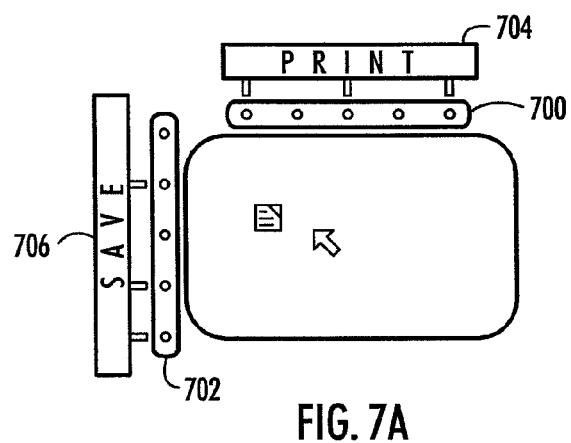
Figure 7B:
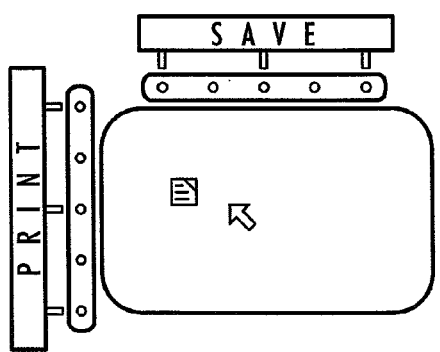

In an embodiment, the tokens may determine the actions performed by the device when an effort to drag the object over a border of the display has been detected. The casing or cover of the device surrounding the display may comprise sensors in such a way that the sensors detect different tokens and the location of tokens. FIGS. 7A and 7B illustrate this embodiment. In the example of FIGS. 7A and 7B, the casing or cover of the device surrounding the display comprises holes or openings 700, 702 which comprise sensors. The tokens 704, 704 comprise pins. When a token is inserted into place, the sensors of the device detect which holes or openings are filled with the pins of the tokens. Each token has a different setting of pins. Thus, the device may distinguish different tokens. The device may be programmed to associate different tokens with different actions.

In the example of FIGS. 7A and 7B, two different tokens are illustrated. The electronic device is programmed to associate token 704 with printing a data object and token 706 with saving a data object. The tokens have different pin settings, as illustrated by FIGS. 7A and 7B. In FIG. 7A, token 704, which is associated with printing, is located on the upper side of the display 300 and token 706, which is associated with saving, is located on the left side of the display 300. The controlling means of the device detect the pin settings of the tokens. On the basis of the locations of the tokens, the controlling means select the predetermined actions which are performed when an effort to drag a data object over the border of the display is detected. In this case, when an effort to drag a data object over the left border is detected, the data object is saved in a given data storage.

In FIG. 7B, the locations of the tokens are switched. The controlling means of the device detect the changed pin settings and adjust the predetermined actions. In this case, when an effort to drag a data object over the left border is detected, the data object is printed using a given printer.

The above embodiment has the advantage of both visually keeping the user up to date of the actions performed when a data object is dragged over the border and simplifying the adjustment of the desired actions. No programming is required to change the actions but only changing of different tokens is required. The only requirement is that the different tokens be associated with the desired actions prior to the use of the device.

The interaction between tokens and sensors may be realized in several ways. In an embodiment described above, pins and holes are utilized. The interaction may also be realized with magnetic interaction, or with electrical contacts, switches, or optical sensors, for example.

In an embodiment, the location of tokens is recognized using RFID (Radio Frequency Identification). Both the sensors and the tokens may comprise RFID transceivers. In an embodiment, the tokens include an RFID tag which the RFID transceiver in the sensors can recognize.

In an embodiment of the invention, the step of detecting an effort to drag the object over a border of the display of the electronic device towards a given direction outside the display may comprise the detection of the force with which the pointing means used in dragging are pressed against the display. This three-dimensional movement detection may be used in giving different commands to the device. The three-dimensional detection may be implemented with a pressure sensitive pointer or a pressure sensitive touch display, for example.

As an example, dragging an object towards a given border with a light pressure may be interpreted as starting a screen saver, and dragging an object towards the same border with a heavy pressure may be interpreted as shutting the device down. The pressure may be measured and compared with a predetermined threshold, and a decision about the pressure may be performed based on the comparison.

In an embodiment, the direction where an item is dragged towards the same border may affect the action which is to be performed. Referring to FIG. 7B, when an item is dragged towards the print token by moving the item up and left, it is printed on a local printer. When an item is dragged towards the print token by moving the item down and left, it is printed on a network printer.

In an embodiment, the solution is implemented as a computer program product encoding a computer program of instructions for executing a computer process for providing an extended user interface in an electronic device where data objects are displayed on a display. The electronic device is configured to execute said computer program.

In an embodiment, the solution is implemented as a computer program distribution medium readable by a computer or an electronic device and encoding a computer program of instructions for executing a computer process for providing an extended user interface in an electronic device. The distribution medium may be one of the following types: a computer readable medium, a program storage medium, a record medium, a computer readable memory, a computer readable software distribution package, a computer readable signal, a computer readable telecommunications signal, a computer readable compressed software package, for example.

Even though the invention is described above with reference to an example according to the accompanying drawings, it is clear that the invention is not restricted thereto but it can be modified in several ways within the scope of the appended claims.

I claim:

1. A method comprising:
   detecting a selection of a data object on the display;
   detecting the dragging of the selected data object based on received movement messages from an input device indicating a requested movement of the selected data object;
   detecting an effort to drag the object over a border of the display towards a given direction outside the display, where the detecting includes starting a timer in response to the object reaching the border of the display and determining the effort to drag the object over the border in response to the movement messages being received for a given time limit determined by the timer;

performing a predetermined action on a basis of the detected effort and the detected direction.

2. The method of claim 1, wherein the predetermined action is performed on the data object.

3. The method of claim 1, wherein the predetermined action is one of the following:
saving the data object on a data storage;
printing the data object;
copying the data object on a data storage;
deleting the data object.

4. The method of claim 3, wherein the predetermined action is printing the data object, and the detected effort and detected direction determine a format used in printing the data object.

5. The method of claim 3, wherein the predetermined action is saving the data object, and the detected effort and detected direction determine the storage where the object is saved.

6. The method of claim 1, wherein the predetermined action is one of the following:
turning off the device;
activating a screen saver;
locking the user interface of the device.

7. The method of claim 1, wherein detecting the selection and the dragging of a data object comprise:
detecting the pressing and holding of a pointer device button and
detecting the movement of the pointer device while the pointer device button is being pressed.

8. The method of claim 1, wherein detecting an effort comprises:
detecting an effort to move a pointer device cursor outside the display area while the pointer device button is being pressed.

9. The method of claim 8, wherein detecting an effort further comprises:
starting and running the timer when detecting an effort to move a pointer device cursor outside the display area and also the pressing of the pointer device button.

10. The method of claim 8, wherein detecting an effort comprises:
detecting the movement of a pointer device cursor in a straightforward manner in a given direction within a predetermined area of the display area.

11. The method of claim 8, wherein detecting an effort comprises:
determining the effort on the basis of sensor input of the device.

12. The method of claim 1, wherein the input device is a touch screen.

13. An apparatus comprising: at least one processor; and at least one memory including computer program code;
the at least one memory and the computer program code configured to, with the at least one processor, cause the apparatus at least to perform:
detecting selection of a data object on the display,
detecting dragging of the selected data object to a border of the display based on received movement messages from an input device indicating a requested movement of the selected data object,
detecting an effort to drag the object over the border in a given direction outside the display, where the detecting includes starting a timer in response to the object reaching the border of the display and determining the effort to drag the object over the border in response to the movement messages being received for a given time limit determined by the timer, and
performing a predetermined action on the basis of the detected effort and the detected direction.

14. An apparatus of claim 13, further comprising a pointer device, and wherein the at least one memory and the computer program code are configured to, with the at least one processor, cause the apparatus to perform
displaying a pointer device cursor on the display,
detecting the pressing and holding of a pointer device button,
detecting the movement of the pointer device, and
detecting an effort to move a pointer device cursor outside the display area while the pointer device button is being pressed.

15. An apparatus of claim 13, further comprising a timer; and wherein the at least one memory and the computer program code are configured to, with the at least one processor, cause the apparatus to perform
starting and running the timer when detecting an effort to move a pointer device cursor outside the display area and also the pressing of the pointer device button.

16. An apparatus of claim 13, comprising a casing surrounding the display, the casing comprising detachable tokens on different sides of the display, the tokens indicating the action performed when a data object is dragged towards the corresponding side of the display.

17. An apparatus of claim 16, wherein tokens indicating different actions are of different colors.

18. An apparatus of claim 13, wherein the at least one memory and the computer program code are configured to, with the at least one processor, cause the apparatus to perform
detecting an effort to move a pointer device cursor outside the display area using one or more sensors in the pointer device or in the electronic device.

19. An electronic device of claim 13, wherein the input device is a touch screen.

20. A computer program product encoding a computer program of instructions for executing a computer process for providing an extended user interface in an electronic device where data objects are displayed on a display, the process comprising:
detecting selection of a data object on the display,
detecting the dragging of the selected data object based on received movement messages from an input device indicating a requested movement of the selected data object,
detecting an effort to drag the object over a border of the display in a given direction outside the display, where the detecting includes starting a timer in response to the object reaching the border of the display and determining the effort to drag the object over the border in response to the movement messages being received for a given time limit determined by the timer,
performing a predetermined action on the basis of the detected effort and the detected direction.

* * * * *